Feb. 7, 1967 L. ESAKI 3,303,427
CRYOGENIC HALL-EFFECT SEMIMETAL ELECTRONIC ELEMENT
Filed Feb. 27, 1962 6 Sheets-Sheet 1

INVENTOR.
LEO ESAKI
BY John F. Ohlandt Jr.
ATTORNEY

Feb. 7, 1967  L. ESAKI  3,303,427
CRYOGENIC HALL-EFFECT SEMIMETAL ELECTRONIC ELEMENT
Filed Feb. 27, 1962

$\lambda = \dfrac{s}{f} \sim d$

United States Patent Office 3,303,427
Patented Feb. 7, 1967

3,303,427
CRYOGENIC HALL-EFFECT SEMIMETAL ELECTRONIC ELEMENT
Leo Esaki, Briarcliff Manor, N.Y., assignor to International Business Machines Corporation, New York, N.Y., a corporation of New York
Filed Feb. 27, 1962, Ser. No. 176,018
9 Claims. (Cl. 329—200)

This invention relates to electronic elements and, in particular, to electronic elements comprising a crystalline body constituted of what are known as semimetals. The term "semimetals" includes elements of the second subgroup of the fifth group of the Periodic Table: bismuth, antimony and arsenic, and alloys thereof.

Although in the past materials have been roughly classified into metals, which are good conductors of electricity, semiconductors, and insulators, there is in addition a unique class of materials known as semimetals which have properties and attributes differing from the above-cited classes. The semimetals can, by proper exploitation, provide novel and desirable device capabilities.

It has been discovered that, under a prescribed set of conditions, the semimetals, and in particular pure bismuth, will exhibit electrical characteristics having notable advantages. The semimetals, i.e., bismuth, antimony and arsenic, may be utilized in various kinds of devices, such as transducers, switches, detectors, oscillators, harmonic generators, mixers and so forth, some of which will provide operating features similar to those obtainable heretofore with semiconductor junction devices. Unlike semiconductor junction devices, however, the constituent materials of semimetal devices do not require doping with impurities and, since a junction is not normally involved in their construction, semimetal devices will not have the capacitance associated with the existence of a junction.

The novel electronic element of the present invention requires low temperatures and a high magnetic field, but these parameters are very easily obtained due to technological advances. For example, the superconducting magnet is well known and is greatly helpful for the purpose of obtaining high magnetic fields.

The basic phenomenon upon which the present invention is based is the electric field dependence of the transverse magnetoresistance of single crystal semimetals. An ancillary phenomenon is the dependence of oscillatory behavior in a semimetal crystal on the orientation and strength of applied magnetic fields.

Although actual experiments have been carried out using only pure bismuth, it is readily predictable that the same behavior found in the case of bismuth will be exhibited by the other semimetals and their alloys, for instance, Bi-Sb alloys.

Accordingly, it is a primary object of the present invention to provide an electronic element constituted of a semimetal and having novel electrical characteristics and capable of high speed operation.

A further object is to provide a semimetal element having a non-linear conduction characteristic in an applied magnetic field.

Yet another object is to provide a single crystal pure bismuth electronic element exhibiting sharp change in its transverse magnetoresistance.

Another object is to provide a rectifier or detector constituted of a semimetal.

Another object is to provide a transducer device constituted of a semimetal.

Another object is to proivde an oscillatory device constituted of a semimetal.

A more specific object is to provide a single crystal pure bismuth active element having ohmic contacts so formed as to prevent damage, such as dislocation, stress, strain, etc., to the active element.

The foregoing and other objects, features and advantages of the invention will be apparent from the following more particular description of preferred embodiments of the invention, as illustrated in the accompanying drawings.

as a function of the rotation angle $\phi$ of the transverse magnetic field about the trigonal axis.

Figure 8:
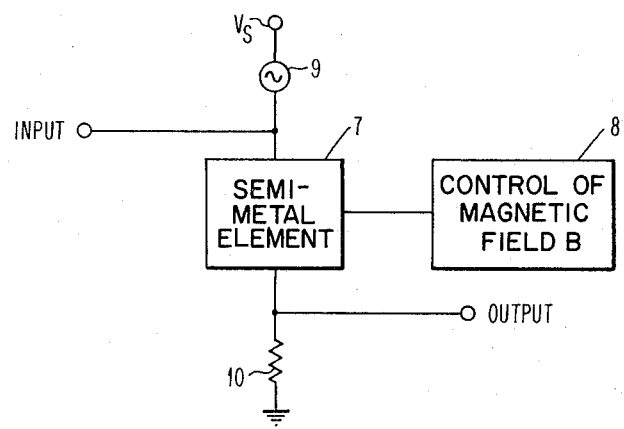

FIG. 8 is a diagram showing the electronic element of the present invention connected in a circuit to provide R.-F. detection, transduction, oscillations or combinations of these functions.

Figure 9:
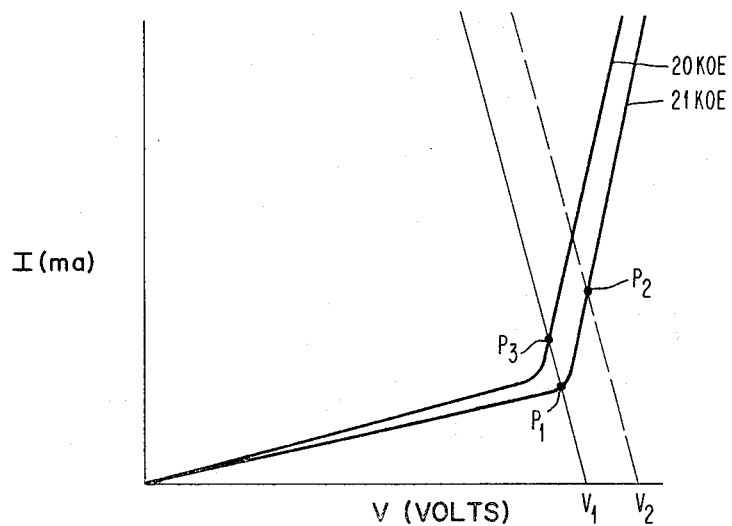

FIG. 9 illustrates several current-voltage characteristic curves for the electronic element of the present invention and representative load lines for depicting the behavior of the circuit of FIG. 8 under certain prescribed conditions.

Figure 10:
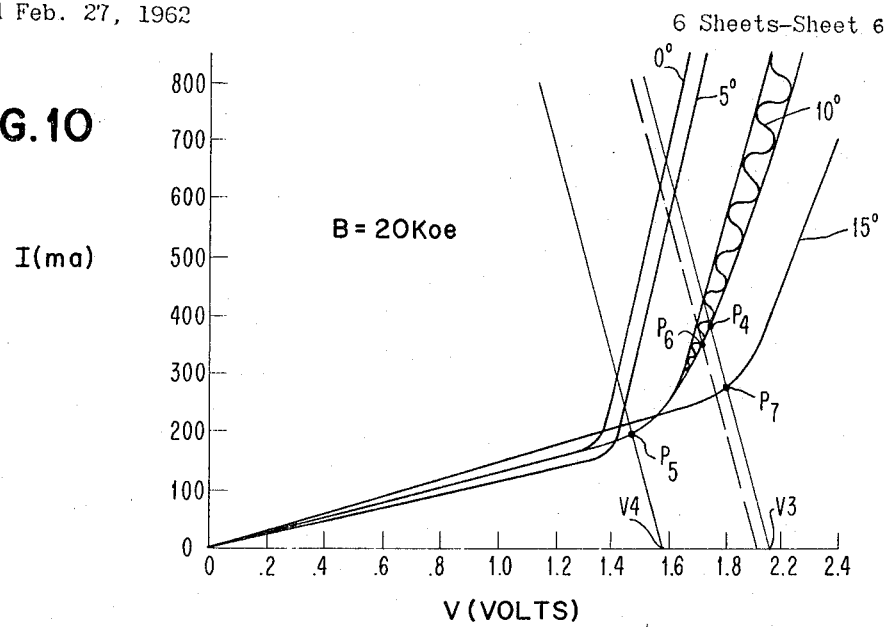

FIG. 10 illustrates the non-linear current-voltage curves with a constant transverse magnetic field of 20-kilo-oersteds and with the electric field direction constant, at varying degrees of angle $\phi$.

Figure 11:
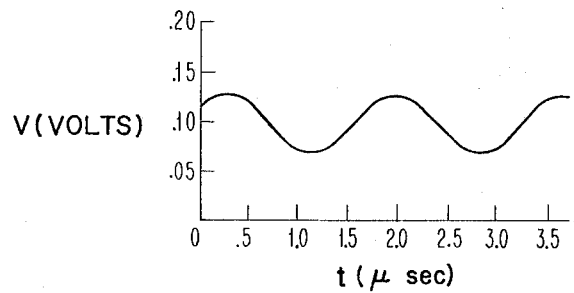

FIG. 11 is a wave form of one type of oscillations observed in a semimetal specimen at a relatively low bias voltage above the kink, for the situation of 10° orientation from the trigonal axis.

Figure 12:
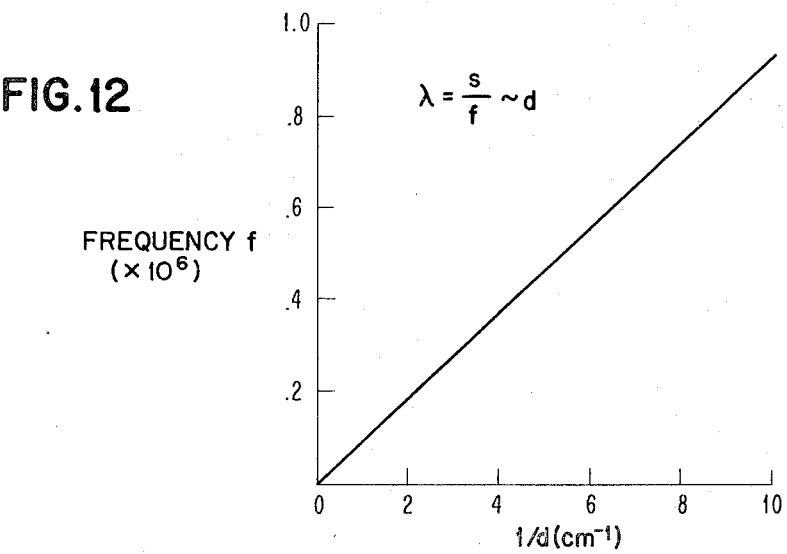

FIG. 12 is a plot of the oscillation frequency versus the reciprocal of the depth of the semimetal specimen.

Although specific reference will be made hereinafter to the use of certain materials and to precise parameters associated with such materials, it will be borne in mind that the principles of the invention are not limited by reason of these specific references.

Before proceeding with a description of the basic electronic element of the present invention and the several applications of this element for specific device purposes, it is considered well to review briefly the electrical properties of semimetals. The electrical properties may be described by invoking the energy band diagram as is conventionally done with semiconductors.

Figure 1A:
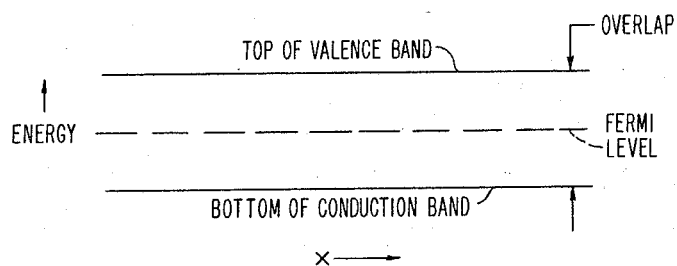
FIG. 1A is an energy band diagram depicting the energy levels in a semimetal and illustrating the overlapping of energy bands.
Figure 1B:
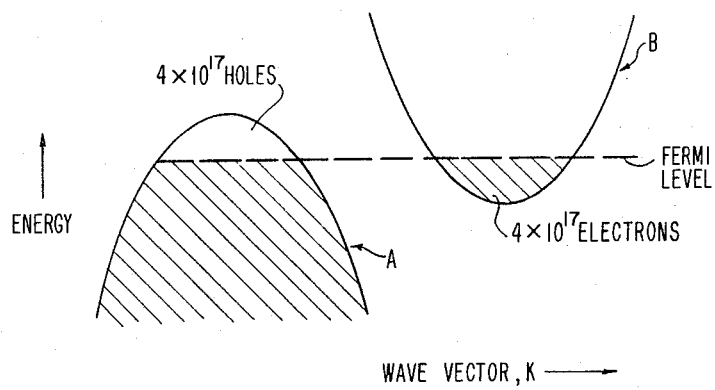
FIG. 1B is a portrayal of the energy states in momentum ($k$) space.

Referring now to FIG. 1A, the energy band diagram for a semimetal is given. It will be seen that, similar to the case of semiconductor materials, the conduction band and valence band edges are portrayed by the solid lines in FIG. 1A. The Fermi level, shown as a dotted line, is situated between the edges of the conduction and valence bands. In contrast with semiconductor materials, however, as indicated in FIG. 1A, the valence band is shown at the top of the diagram and the conduction band at the bottom. Thus, there is an overlap of these bands. For bismuth this overlap is on the order of 0.020 electron volt. In a pure semimetal this gives rise to equal numbers of holes and electrons, even at low temperatures, in the almost-filled valence and almost-empty conduction bands, respectively. This condition may be appreciated by referring now to FIG. 1B wherein is portrayed the energy states in what is known as momentum or $k$ space. As may be seen, the parabolas A and B which represent the energy states in the valence and conduction bands, respectively, overlap. The tips of the parabolas A and B correspond, respectively, to the valence band edge and conduction band edge as depicted in FIG. 1A. The hatched lines inside the parabolas A and B indicate that the energy states in the valence band are almost entirely filled with electrons and the states in the conduction band are almost empty. Thus, what is portrayed is a situation where there is a spilling over of the electrons from the valence band to the conduction band. As is well known to those skilled in the art, it is a necessary condition for electronic conduction that the bands be only partly filled.

In very pure semimetals, and in particular for the case of bismuth, electrons have very low effective mass and exhibit anistropy, that is, they move more readily in certain directions through the crystal body than in other directions. Electrons have a very high mobility in bismuth, on the order of $10^7$ cm.$^2$/volt-sec. at low temperatures (2–4° K.) as compared with 3000 cm.$^2$/volt-sec. in germanium at room temperature. The mean-free path of electrons is likewise very long in bismuth, on the order of 2–3 mm. at the low temperature of operation, as compared with 100–1000 angstroms in germanium at room temperature.

Figure 2A:
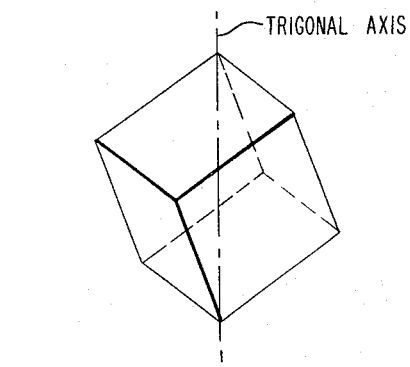
FIG. 2A is a diagram of the crystal lattice of a semimetal, such as bismuth, illustrating schematically the rhombohedral structure.
Figure 2B:
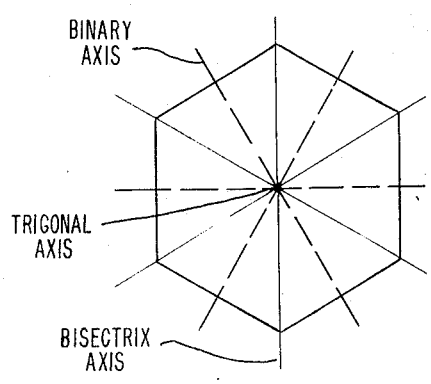
FIG. 2B is a projection of the rhombohedral structure of FIG. 2A as a hexagon.

Referring now to FIG. 2A, there is shown a crystal lattice of a semimetal, such as bismuth, which has a rhombohedral structure. For a complete picture of the crystallographic nature of such an element, reference may be had to page 123 of Electrons and Phonons by J. M. Ziman, Clarendon Press (Oxford University, 1960). In FIG. 2A, the trigonal axis is represented by the broken line drawn as a diagonal through the crystal lattice. In FIG. 2B there is shown a hexagon which is a projection of the lattice of FIG. 2A. Shown at various points around the hexagon are the binary axes represented by the dotted lines and the bisectrix axes represented by the light solid lines; a typical one of each has been labelled in FIG. 2B. The trigonal axis in this view is represented by the dot in the center. These various axes will be referred to in later portions of the specification.

Figure 3A:
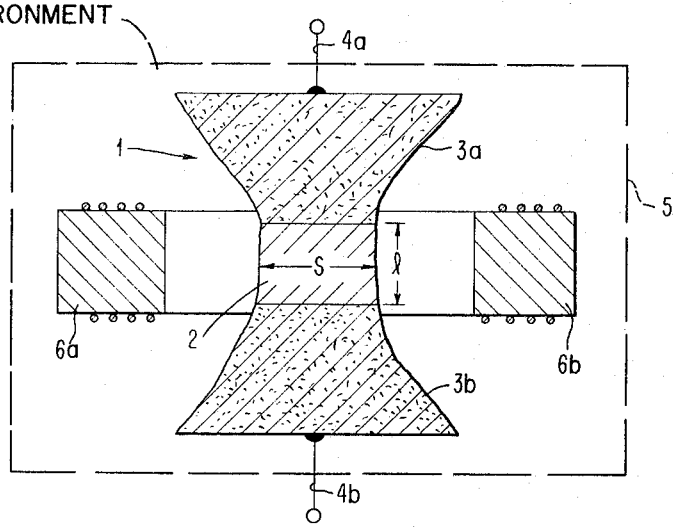
FIG. 3A is a front view in section of the semimetal electronic element of the present invention with a schematic showing of the apparatus employable therewith for producing the requisite operating conditions.

FIG. 3A is a front view of the electronic element of the present invention including the apparatus employed therewith for providing the requisite operating conditions. The electronic element 1 is shown as constituted of a central portion 2, which is the active region of the element, and portions 3a and 3b at either end which serve, electrically, merely as ohmic contacts to the active portion. However, these contacts are important in preventing damage to the active region in handling and use. Conductors 4a and 4b are soldered to the ohmic contacts 3a and 3b, respectively, for circuit connecting purposes. The box labelled 5 shown by dotted lines is representative of a low temperature environment that is used for the operation of electronic element 1. Such a low temperature environment would have temperatures on the order of liquid helium, that is, 2–4° K. Means for providing such an environment are well known to those skilled in the art, especially to those skilled in the cryogenic art wherein means such as Dewar flasks filled with liquid helium are conventionally employed. The apparatus for providing the required magnetic field is shown schematically as a pair of electromagnets 6a and 6b connected to an energizing source, not shown in this figure.

The entire structure of the electronic element 1, as shown in FIG. 3A, is achieved by a technique well known to those skilled in the art, namely, a crystal pulling technique known as the Czochralski technique. The details of this technique may be appreciated by referring to Section 6–15 of the Handbook of Semiconductor Electronics by Lloyd P. Hunter (McGraw-Hill, 1956). The active portion 2 of the electronic element 1, which portion is of pure bismuth in a preferred embodiment of the present invention, is initially much larger than shown in this figure. The relatively large, pure portion, having been carefully cut, has grown onto it a heavily doped ohmic contact, for example, contact 3a shown in FIG. 3A, by reason of heavy doping of the melt. Thereafter, the other ohmic contact 3b is grown but the arrangement is such that the first ohmic contact 3a is secured in the crystal pulling apparatus and the relatively large, pure portion is melted back, that is, it is lowered into the melt whereby only a relatively small part of the original pure portion remains. Then the entire assembly is slowly removed from the melt and, because the melt is highly doped, the other ohmic contact 3b is consequently grown onto the active portion 2. The central portion 2 is etched down to the size shown and, typically, would have a length $l$ on the order of 0.7 mm. and a dimension $s$ on the order of 1 mm.

Figure 3B:
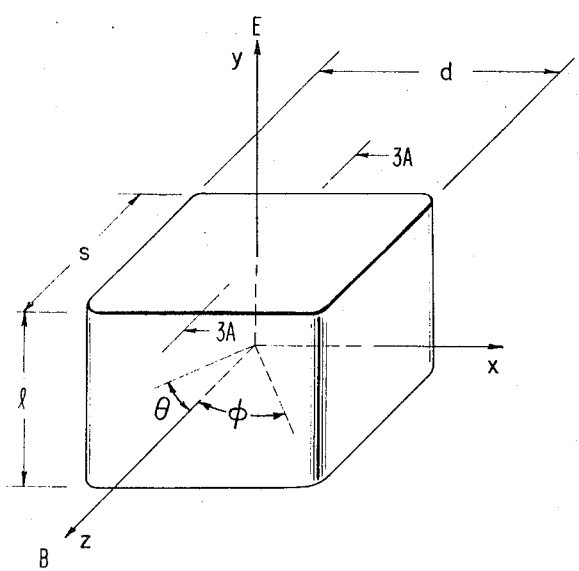
FIG. 3B is a three-dimensional view of the active portion 2 of the electronic element 1 previously shown in FIG. 3A.

FIG. 3B illustrates the active portion 2 of the electronic element 1 shown in FIG. 3A, the dimensions labelled $s$ and $l$ corresponding to the dimensions so labelled in FIG. 3A. The dimension $d$ represents the depth of the active portion 2. The electric field E is shown oriented along the axis labelled $y$ which, in a typical arrangement, corresponds approximately to the bisectrix axis of the semimetal crystal. The magnetic field B in FIG. 3B is shown perpendicular to the electric field and oriented along the axis labelled $z$. This magnetic field is oriented in a typical arrangement so as to be parallel to the trigonal axis of the semimetal crystal. For the given orientation of the electric and magnetic fields, the $x$ axis which corresponds to the binary axis is the axis along which the carriers, holes and electrons, will move as will be described hereinafter.

Figure 3C:
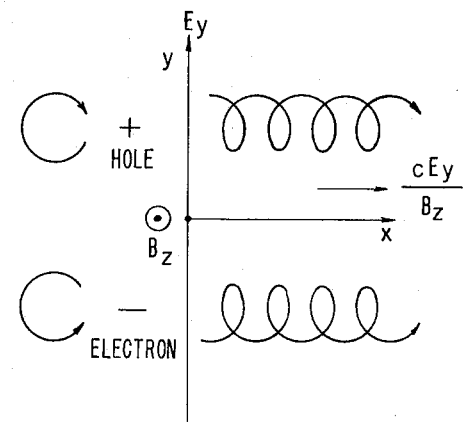
FIG. 3C is a portrayal of the movement of carriers, that is, holes and electrons, within the semimetal element under applied electric and magnetic fields.

Referring now to FIG. 3C, there is depicted the motion of the carriers in the semimetal specimen of FIG. 3B. The electric field is labelled $E_y$ and the magnetic field $B_z$ corresponding to the aforesaid orientation in FIG. 3B. The motion of a charged particle of $m^*$ and velocity $v$ in a strong magnetic field $B=B_z$ and an electric field $E=E_y$, perpendicular to each other, is classically given by a cyclotron rotation of angular frequency $$\omega = \frac{eB_z}{m^*c}$$

and radius $$r = \frac{m^*cv}{eB_z}$$

and a motion of velocity $$v_x = \frac{cE_y}{B_z}$$

in the $x$ direction, which is independent of both the particle's mass and its velocity as well as the sign of its charge.

In the case of the bismuth sample referred to, this velocity $v_x$ has turned out to be approximately $10^5$ cm./sec. at a critical value of electric field, denominated the kink field $E_k$, no matter what the magnetic field is. This numerical value, moreover, seems fairly comparable to the sound velocity $s$ in bismuth and, hence, one can write $$v_x = \frac{cE_k}{B} \approx s$$

where $c$ is the velocity of light. This fact suggests that a strong electron-phonon interaction occurs when the velocity $v$ reaches this critical value. The wave function $\psi k_x n k_z$ where $n$ is an integer indicating a particular energy level, for a charged particle at such crossed fields, $B_z$ and $E_y$, as described above, is given by $$\psi k_x n k_z = \frac{\exp[i(k_x x + k_z z)]}{\sqrt{L_x L_z}} \phi_n \left[ y - \frac{\hbar c k_x}{eB_z} + \frac{E_y m c^2}{eB_z^2} \right]$$

The central coordinate $y_0$ of the cyclotron motion is $$y_0 = \frac{\hbar c k_x}{eB_z}$$

The current, that is, the transport of carriers in the direction of the electric field $E_y$ is brought about only by scattering for such a case as the strong transverse magnetic field. In the case of bismuth, there is an evidence of considerable contribution of the lattice scattering even below 4.2° K. Therefore, from momentum conservation the change of the electron wave vector $(k'_x - k_x)$ due to the change of the central coordinate $y_0$ by one scattering should be equal to the wave vector $q_x$ of a phonon emitted and also the energy, which the electron can get from the electric field and can give to the phonon, should be greater than the phonon energy $\hbar\omega(q_x)$ of such a wave vector $q_x$. This single phonon emission condition is written by $$eE_y \delta y_0 = eE_y \frac{\hbar c}{eB_z}(k_x' - k_x) \geq \hbar\omega(q_x)$$

Therefore, $$\frac{cE_y}{B_z} \geq \frac{\hbar\omega(q_x)}{k_x'' - k_x} = \frac{\omega(q_x)}{q_x} = s_x$$

The maximum energy which an electron can get in one scattering process may be estimated as $$eE_y \delta y_0 = 2erE_y \sim 2 \times 10^{-4} \text{ ev.}$$

if a circular orbit is assumed rather than an elongated ellipse. Therefore, because only a linear portion in the dispersion curve near $q_x = 0$ is concerned, the right-hand side $s_x$ of the above inequality is exactly equal to the sound velocity in the $x$ direction. If this sort of consideration is correct, the crystal orientation dependency of the quantity $$\frac{cE_k}{B}$$

represents the orientation dependency of the sound velocity of some mode.

Figure 4A:
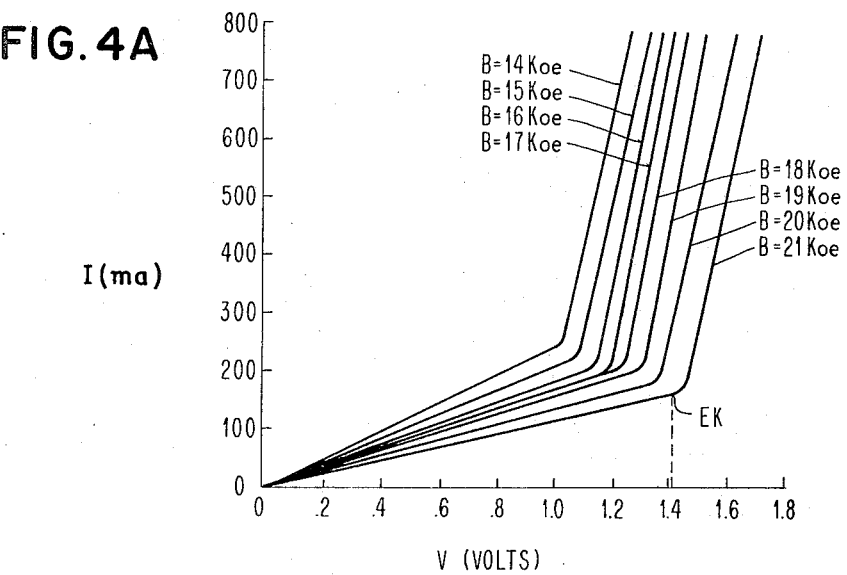
FIG. 4A is a graph depicting a family of current-voltage curves with magnetic field as the parameter.

Referring now to FIG. 4A, a graph is shown which depicts a family of current-voltage characteristic curves with magnetic field as the parameter. These curves result from applying varying values of magnetic fields, shown to vary from 14 kilo-oersteds to 21 kilo-oersteds reading from left to right. The orientation of the magnetic field B for the curves in FIG. 4A corresponds with the orientation along the $z$ axis in FIG. 3B. Thus, as previously described, the magnetic field B is oriented to be parallel to the trigonal axis of the semimetal specimen. Likewise, the electric field applied to the specimen is as indicated in FIG. 3B, that is, the direction of current and electric field is along the bisectrix axis of the semimetal specimen. The curves in FIG. 4A make clear the basic phenomenon of the present invention; namely, the electric field dependence of the transverse magnetoresistance of a single crystal semimetal. A very sharp transition occurs in the magnetoresistance of the semimetal at the critical value of the electric field called the kink field $E_k$. Considering one curve, for example, the curve on the far right which represents a condition of magnetic field of a value of 21 kilo-oersteds applied to the semimetal specimen of FIGS. 3A and 3B, the magnetoresistance is high and, hence, the conductivity of the specimen is comparatively low up to an applied voltage of approximately 1.4 volts, which corresponds to an electric field for a specimen of 0.7 mm. in length, of 20 volts/cm. As can be seen, beyond this critical value of voltage, or kink field $E_k$, the conductivity changes significantly.

Figure 5:
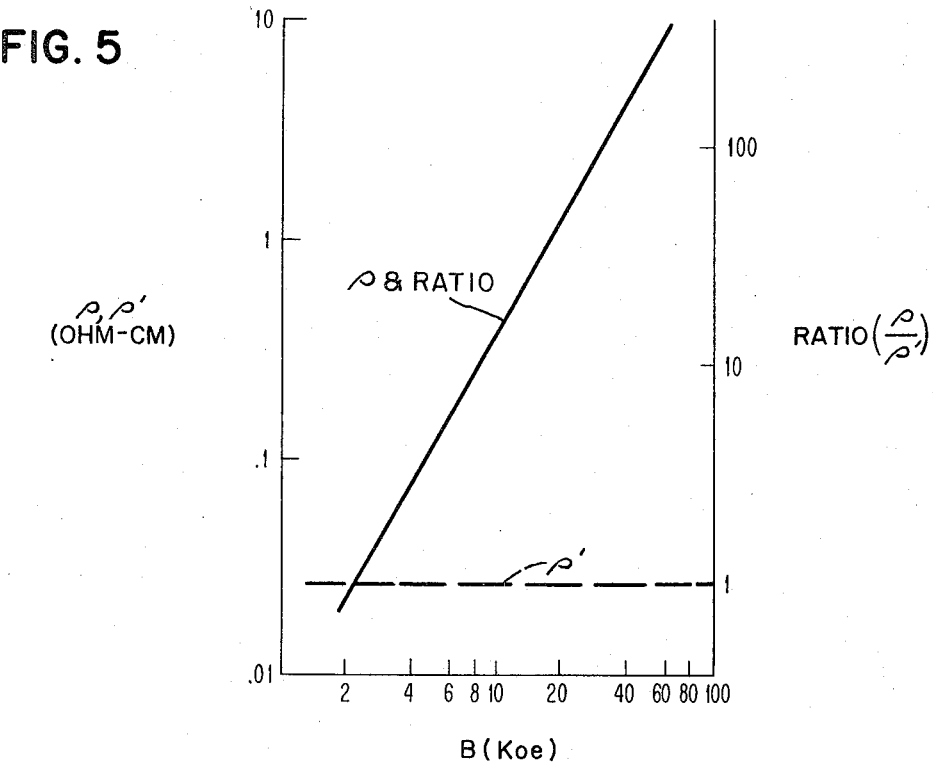
FIG. 5 is a log-log plot of (1) the ordinary transverse magnetoresistance $\rho$, (2) the differential magnetoresistance $\rho'$ beyond the critical value of electric field known as the kink field ($E_k$), and (3) the ratio $\rho/\rho'$; all versus the magnetic field.

The change in conductivity can be appreciated by referring to FIG. 5 wherein there is plotted the differential magnetoresistance $\rho'$, which is derived from the straight line portions beyond the kink field $E_k$ in the current-voltage curves of FIG. 4A. The differential magnetoresistance plot, shown dotted, is fairly independent of the magnetic field contrary to the strong magnetic field dependence of the ordinary magnetoresistance $\rho$. The solid curve represents the magnetoresistance variation when the field is below the kink field $E_k$. It should be noted that the magnetoresistance drops in value from several times to more than 100 times after the onset of the kink. Of course, this is only one example of an experimental ratio and it is expected that by improvement in the quality of the material higher ratios would be obtainable.

Figure 4B:
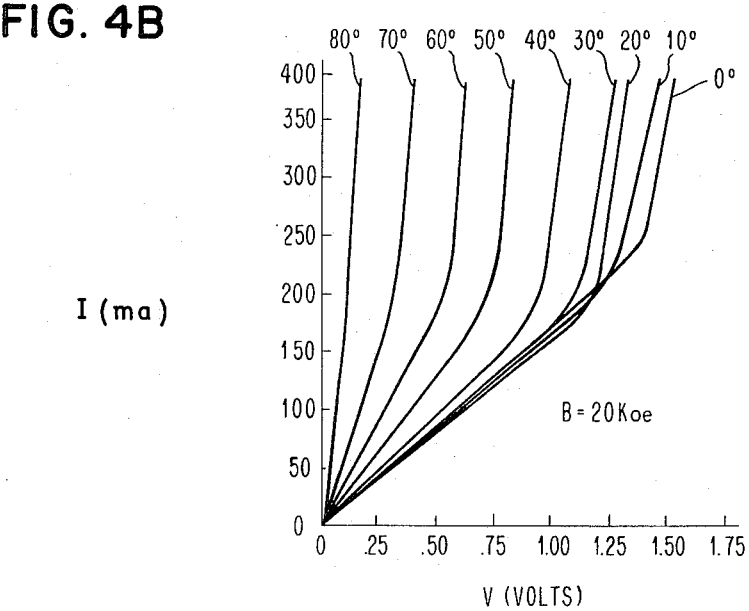
FIG. 4B is a graph depicting another family of current-voltage curves with the position of the magnetic field B (at an angle $\theta$ from the transverse direction toward the longitudinal direction) as the parameter.

Referring now to FIG. 4B, there is shown another family of curves similar to those depicted in FIG. 4A. However, the parameter herein is the variation of the orientation of the magnetic field from the transverse or $z$ direction toward the longitudinal or $y$ direction, the latter direction being the one in which the electric field is oriented, as may be appreciated by referring to FIG. 3B. The curve on the far right of FIG. 4B is taken at a value of magnetic field of 20 kilo-oersteds and with the orientation of the electric and magnetic fields in the $y$ and $z$ directions, respectively. The curves moving to the left depict the situation where the magnetic field is removed by an angle of $\theta$ from the $z$ axis in 10° steps toward the longitudinal or $y$ direction.

Figure 6:
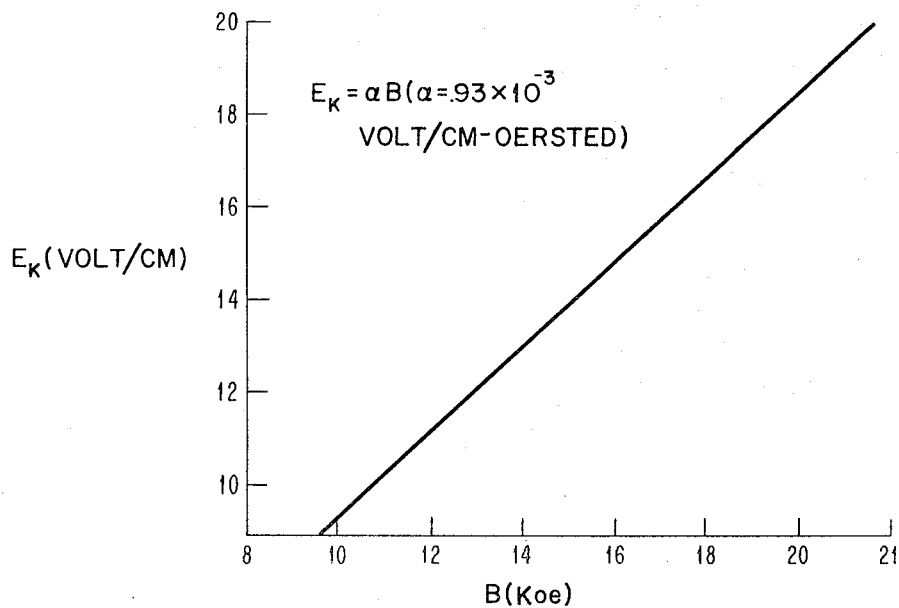
FIG. 6 illustrates the relationship between the applied magnetic field B and the kink field, $E_k$.

FIG. 6 illustrates the magnetic field dependence of the kink field $E_k$, derived from the graph of FIG. 4A, which gives a very simple relationship $E_k = \alpha B$ (with the constant $\alpha$ being approximately $10^{-3}$ volts/cm.-oersted) over the whole range of the applied magnetic field no matter what the length of the specimen is. However, it will be seen as described hereinafter that the sharpness of the kink and the kink field strength are very sensitive to the crystal orientation when the magnetic field is oriented away from the trigonal axis.

Figure 7:
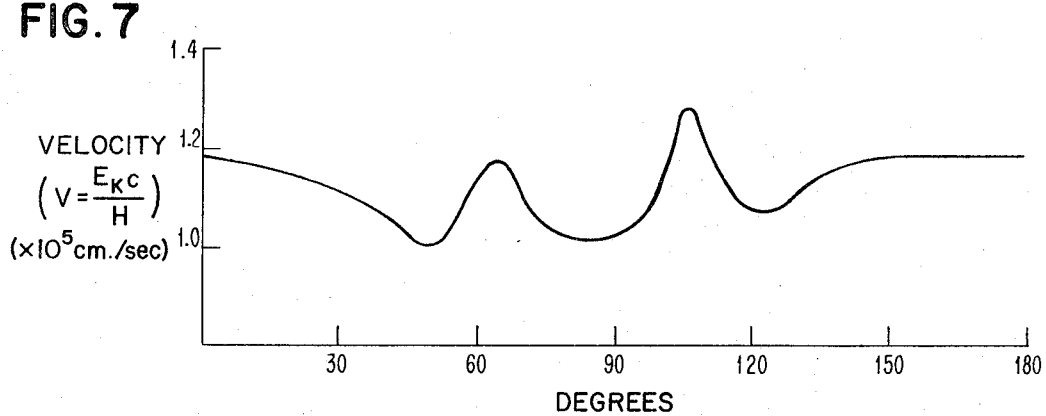
FIG. 7 depicts the experimentally obtained value of velocity $$\left(v=\frac{cE_k}{B}\right)$$

FIG. 7 shows the experimental values of velocity $$v = \frac{cE_k}{B}$$

as a function of the rotation angle of the transverse magnetic field; that is, referring back to FIG. 3B, the experimental values for velocity have been obtained when the magnetic field is removed by an angle $\phi$ from the $z$ axis toward the $x$ axis. Thus, the magnetic field is always perpendicular to the electric field but is rotated in the $x$–$z$ plane. In FIG. 7, the 0° and 180° points represent a situation where the magnetic field is directed along the trigonal axis and with the intermediate points being taken at varying degrees of the angle $\phi$ from the trigonal axis. It will, of course, be appreciated that the electric field direction is constant for the situation depicted in FIG. 7. The value of $v$ in the trigonal direction is in agreement with the sound velocity of the shear mode.

Having described the basic electronic element of the present invention and its significant properties and characteristics, consideration is now turned to the various device applications for the basic element, such as, detection and transduction.

FIG. 8 is a diagram showing the electronic element of the present invention connected in a circuit for providing R-F detection. The block labelled 7 contains the semimetal element of FIG. 3A together with the apparatus employed therewith for providing the requisite low temperature environment and magnetic field. The block labelled 8 connected to block 7 represents a variable source which may be either a magnetic means or an electrical means for supplying varying amounts of energy in order to produce different values of magnetic field. Typically, this source would be a variable power supply connected to electromagnets 6a and 6b of FIG. 3A. A voltage source labelled $V_s$, whose other end is connected to ground, is shown connected to a modulated signal source 9. This source 9 is a typical R-F signal source which is connected to the top of block 7. A resistor 10 is connected at the bottom of block 7 and to ground. An output terminal connected to the top of resistor 10 serves for sensing output signals across resistor 10, with ground as the reference. The connecting lines to block 7 at the top and bottom thereof correspond to the conductors 4a and 4b of FIG. 3A. An input terminal is connected, as shown, to block 7, for providing input signals that may be used in a modification to affect the operation of the circuit.

The apparatus as illustrated in FIG. 8 may be used for providing linear demodulation of an R-F signal. Referring now to FIG. 9, two of the current-voltage characteristic curves that appeared in FIG. 4A have been redrawn in FIG. 9. These two curves are for the situation where 20 kilo-oersteds and 21 kilo-oersteds are applied to the semimetal element within block 7. A quiescent load line, shown as a solid line in FIG. 9, is drawn for one type of circuit operation; namely, for example, where R-F detection is desired. The supply voltage $V_s$ is selected to have a value $V_1$ as indicated in FIG. 9, and, with judicious selection of the value of resistance for resistor 10, the solid load line will intersect the 21 kilo-oersted current-voltage characteristic curve at a point $P_1$ just before the sharp change in the slope of the current-voltage characteristic curve. This one stable point for circuit operation is, as has been pointed out before, at the critical field value $E_k$ for the semimetal element.

As is understood by those skilled in the art, the application of a modulated signal from source 9 superimposed upon the selected direct voltage value for $V_s$, results in a rectification of the modulated signal due to the nature of the current-voltage characteristic curve. Thus, as can be appreciated from FIG. 9, the positive half-cycles of an applied modulated voltage wave will produce positive half-cycles of current which are greater than the negative half-cycles, and the R-F average will be of the same wave shape as the envelope of the applied modulated wave.

Although a simple example of a linear detector has been chosen to illustrate one application of the present invention, it will be apparent to the skilled worker that numerous applications may be obtained by suitable modification. Thus, various types of logical gates or switches, harmonic generators and mixers are possible due to the peculiar nature of the current-voltage characteristic curve of the electronic element of the present invention. The dotted load line, also shown in FIG. 9, illustrates the fact, that, if an input signal be applied to the input terminal so marked in FIG. 8, and with the modulated signal source 9 not present in the circuit of FIG. 8, a simple gating function can be advantageously realized. Thus, responsive to a change in voltage applied to the semimetal element from a value of $V_1$ to a value of $V_2$, the conductivity of the semimetal element and, hence, the impedance presented to an input signal will be substantially changed. An input signal may be gated through from the input to output with very little impedance in the case where the operating point is $P_2$, whereas, when the operating point is $P_1$ or lower, a relatively large impedance will be encountered. Also, gating can be achieved by changing the supply voltage $V_s$ to the value, $V_2$, corresponding to the intersection of the dotted load line with the $x$ axis in FIG. 9.

Since the value of magnetic field is also a controlling parameter in the operation of the semimetal element within block 7 in the circuit of FIG. 8, the present invention may be adapted to provide transduction from magnetic to electrical energy or to provide gating action by reason of the control afforded over the semimetal element by the magnetic field. Referring again to FIG. 9, it will be seen that for the given quiescent load line, shown as a solid line, the conductivity of the semimetal element and, hence, the impedance thereof and the output derived from the circuit can be altered by a variation in the magnetic field strength. With a change produced by varying, for example, the energy supplied to the magnetic field elements, 6a and 6b specifically shown in FIG. 3A, a change in circuit operation from point $P_1$ on the current-voltage characteristic curve labelled 21 kilo-oersteds to a point $P_3$ on the current-voltage characteristic curve labelled 20 kilo-oersteds can be realized. Thus, by a change of 1 kilo-oersted in the magnetic field applied to the semimetal element within block 7, the conductivity of the element is changed from relatively low value at point $P_1$ to a relatively high value at point $P_3$. Therefore, transduction from magnetic to electrical energy or gating of an electrical signal from input to output in the circuit of FIG. 8 is readily accomplished.

An ancillary phenomenon associated with the present invention is the dependence of oscillatory behavoir in a semimetal crystal on the orientation and strength of the applied magnetic field. Referring now to FIG. 10, this ancillary phenomenon is graphically portrayed. The curves in FIG. 10 exhibit a similar shape to those previously illustrated in FIG. 4A. However, in FIG. 10, the controlling parameter is the orientation of the applied transverse magnetic field. This effect has been reasonably well explained on the basis of the electron-phonon interaction with consequent enhanced phonon emission as previously discussed. The general situation of the electron-phonon interaction is explained in the following way: electrons pick up energy from the phonons in the range of electric field values below the critical value $E_k$ while they give their energy to the phonons beyond this critical value.

In FIG. 10, the current-voltage characteristic curves were obtained with a typical value of 20 kilo-oersteds for the magnetic field applied to the electronic element as shown in FIG. 3A. The magnetic field elements 6a and 6b in FIG. 3A are rotated in a direction perpendicular to the plane of the paper. This may also be seen by referring to FIG. 3B wherein the angle $\phi$ is the angle by which the magnetic field is removed from the $z$ direction. The angles of rotation, as shown in FIG. 10, are 0°, 5°, 10° and 15° from the $z$ direction which, as has been previously discussed, is the direction parallel to the trigonal axis of a bismuth specimen. It will be noted that, as indicated in FIG. 10, an oscillation pattern appears when the magnetic field is oriented approximately 10° from the trigonal axis. It has been verified that the oscillation frequency obtained depends mainly on the size of the bismuth specimen and not on the external circuit in which the specimen is connected.

The ancillary phenomenon of oscillations in a semimetal specimen may, by reason of the piezoelectric character of the specimen, be exploited to provide an electrical oscillatory device. Thus, referring again to FIG. 8, the semimetal element in block 7 is oriented at an angle of approximately 10° from the trigonal axis and with a suitable load line, which is chosen by taking a value for the supply voltage, $V_s \sim 2.0$ volts. This value is chosen as $V_3$, as shown on the graph in FIG. 10. The solid load line on the right thereby intersects the current-voltage characteristic curve for the 10° orientation at a point labelled $P_4$. The oscillations produced in the semimetal element are translated via the piezoelectric effect into electrical oscillations which are then taken from the circuit across resistor 10.

It will also be appreciated by those skilled in the art that the oscillatory behavoir of the semimetal specimen may be advantageously employed in a two-state circuit operation, that is, a load line, shown as a solid line on the left in FIG. 10, may be selected by choosing a value $V_4$ for the supply voltage $V_s$ and then, again, by either applying a pulse to the input terminal shown in FIG. 10 or by changing the instantaneous value of $V_s$, a dynamic load line, shown dotted in FIG. 10, may be obtained. The circuit state is changed from a low conductivity state with a point of operation at $P_5$ to a high conductivity and oscillatory state with the point of operation at $P_6$. Likewise, it will be apparent that by changing the orientation of the semimetal specimen, the circuit operation may be changed along the solid load line on the right from point $P_7$ to point $P_4$; that is, again the state of the circuit is changed from a low conductivity one to a high conductivity one with oscillatory behavoir.

FIG. 11 shows one wave form that has been obtained where the semimetal specimen had a depth $d$ of 1.8 mm. The period of this wave corresponds to a frequency of approximately 550 kc.

In FIG. 12, the frequency $f$, that is, the frequency of a wave form as portrayed in FIG. 11, is plotted against the reciprocal of the specimen depth $d$. In experiments, the varying values of width were obtained by etching a single specimen step by step. The straight line appearing in FIG. 12 clearly indicates the relation $$\lambda = \frac{s}{f} \sim d$$

where $s$ and $\lambda$ are the sound velocity in bismuth and the wave length, respectively, giving $s$ approximately $10^5$ cm./sec.

It will be appreciated by those skilled in the art that many other variations and modifications may be realized for operation of the electronic element of the present invention. Any kink voltage $V_k$ may be obtained simply by choosing the appropriate length $l$ of the electronic element in FIG. 3A, due to the relationship $V_k = lE_k$. Also, by adjusting the magnetic field strength a desired kink voltage $V_k$ may be obtained. In addition, any curvature around the kink voltage either a hard or a soft curve may be obtained by selecting a suitable crystal orientation.

What has been described is a novel solid state electronic element comprised of a semimetal crystalline body which is subjected to prescribed values and orientations of magnetic and electric fields. Due to the unique characteristics exhibited by this element and notably its sharp change in conductivity at a critical value of applied electric field, many types of device applications are possible. Only a fraction of these possibilities have been embodied herein, but others will be apparent. The electronic element of the present invention has been shown to have several striking advantages. For example, it is not required that the element per se have impurities included in its fabrication and there is no space charge capacitance in its makeup. These properties distinguish it from the conventional semi-conductor junction devices. The mechanism of its operation indicates that it is inherently very fast, capable of operating speeds corresponding to a time period on the order of 0.1 nanosecond.

While the invention has been particularly shown and described with reference to preferred embodiments thereof, it will be understood by those skilled in the art that the foregoing and other changes in form and details may be made therein without departing from the spirit and scope of the invention.

What is claimed is:

1. An electronic element comprising:
   a semimetal crystalline body;
   load means connected in electrical circuit arrangement with said crystalline body;
   means for maintaining said crystalline body at a temperature whereat the magnetoresistance of said crystalline body is electric field dependent;
   means for applying perpendicular electric and magnetic fields to said crystalline body of such value that said crystalline body exhibits a sharp change in its magnetoresistance from a relatively high value to a relatively low value when the magnitude of said electric field is increased above a critical value.

2. An electronic element comprising:
   a semimetal crystalline body;
   load means connected in an electrical circuit arrangement with said crystalline body;
   means for maintaining said crystalline body at a temperature whereat the magnetoresistance is electric field dependent;
   means for applying to said crystalline body substantially perpendicular magnetic and electric fields of such values that said crystalline body exhibits a sharp change in conductivity such that its current voltage characteristic curve is nonlinear and exhibits a knee at a given critical value of electric field for a given value of magnetic field; and
   means for substantially altering the conductivity of said crystalline body by independently varying the value of the applied magnetic field and the applied electric field.

3. An electronic element as defined in claim 2 wherein said crystalline body is constituted of an element selected from the group consisting of bismuth, antimony and arsenic.

4. An electronic element as defined in claim 2 wherein said crystalline body is constituted of bismuth.

5. The invention as defined in claim 4 wherein the magnetic field is applied parallel to the trigonal axis of the crystalline body and the electric field is applied perpendicular to said magnetic field along the bisectrix axis of said crystalline body.

6. The invention as defined in claim 2, further comprising:
   means for substantially altering the conductivity of said crystalline body by maintaining the value of magnetic field constant and independently varying the value of applied electric field.

7. An electronic element comprising:
   a semimetal crystalline body;
   means for maintaining said crystalline body at a temperature whereat the magnetoresistance of said crystalline body is electric field dependent;
   means for applying to said crystalline body substantially perpendicular magnetic and electric fields of such values that said crystalline body exhibits a sharp change in the slope of its current-voltage characteristic curve;
   biasing means for fixing the point of operation of said crystalline body along the changed slope of said current-voltage characteristic curve where acoustic oscillations within said body occur;
   means for orienting the crystalline body at a predetermined angle with respect to the magnetic field; and
   output means for sensing the electrical oscillations responsive to the occurrence of acoustic oscillations in said crystalline body.

8. An electronic element comprising:
   a semimetal crystalline body;
   load means connected in electrical circuit arrangement with said crystalline body;
   means for maintaining said crystalline body at a temperature whereat the magnetoresistance is electric field dependent;
   means for applying to said crystalline body substantially perpendicular magnetic and electric fields of such values that said crystalline body exhibits a sharp change in conductivity such that its current-voltage characteristic curve is nonlinear and exhibits a knee at a given critical value of electric field for a given value of magnetic field;

means for biasing said crystalline body at the knee of said current-voltage characteristic curve; and means for changing the value of said magnetic field applied to said crystalline body thereby substantially altering the conductivity and impedance of said crystalline body whereby a transducer device is provided.

9. An electronic element comprising:

a semimetal crystalline body;

load means connected in electrical circuit arrangement with said crystalline body;

means for maintaining said crystalline body at a temperature whereat the magnetoresistance is electric field dependent;

means for applying to said crystalline body substantially perpendicular magnetic and electric fields of such values that said crystalline body exhibits a sharp change in conductivity such that its current-voltage characteristic curve is nonlinear and exhibits a knee at a given critical value of electric field for a given value of magnetic field;

means for connecting a modulated signal source to said crystalline body; and means for biasing said crystalline body at the knee of said current-voltage characteristic curve whereby a detector device is provided.

References Cited by the Examiner

UNITED STATES PATENTS

| | | | |
|---|---|---|---|
| 1,825,855 | 10/1931 | Craig | 329—200 |
| 2,902,660 | 9/1959 | Weisshaar | 332—51 |
| 3,010,034 | 6/1961 | Steele et al. | 307—88.5 |
| 3,011,064 | 11/1961 | Duinker | 307—88.5 |
| 3,030,559 | 4/1962 | Borneman et al. | 317—234 |
| 3,045,341 | 7/1962 | Kolenko et al. | |
| 3,046,458 | 7/1962 | Basiago et al. | 317—234 |
| 3,050,698 | 8/1962 | Brass | 332—51 |

OTHER REFERENCES

U.S. Bureau of Standards, Circular No. 382, April 2, 1930, 41 pp.; pp. 6, 7 and 8 relied on.

Westinghouse Engineer, May 1957, Lawson, vol. 17, No. 23, pp. 71–72, "The Hall Effect."

Connell et al.: Physical Review, vol. 107, No. 4, pp. 940–946, September 1957.

ROY LAKE, *Primary Examiner.*

A. L. BRODY, N. KAUFMAN, *Assistant Examiners.*